United States Patent [19]

Chauvel

[11] Patent Number: 4,814,756
[45] Date of Patent: Mar. 21, 1989

[54] VIDEO DISPLAY CONTROL SYSTEM HAVING IMPROVED STORAGE OF ALPHANUMERIC AND GRAPHIC DISPLAY DATA

[75] Inventor: Gerard Chauvel, Cagnes/Mer, France

[73] Assignee: Texas Instruments Incorporated, Dallas, Tex.

[21] Appl. No.: 9,578

[22] Filed: Jan. 28, 1987

Related U.S. Application Data

[63] Continuation of Ser. No. 715,788, Mar. 25, 1985, abandoned, which is a continuation of Ser. No. 328,777, Dec. 8, 1981, abandoned.

[30] Foreign Application Priority Data

Dec. 12, 1980 [FR] France ............... 80 26392
Dec. 12, 1980 [FR] France ............... 80 26393
Dec. 12, 1980 [FR] France ............... 80 26395

[51] Int. Cl.$^4$ ........................................ G09G 1/16
[52] U.S. Cl. .......................... 340/750; 340/747
[58] Field of Search ............ 340/721, 726, 724, 747

[56] References Cited

U.S. PATENT DOCUMENTS

| | | | |
|---|---|---|---|
| 3,891,792 | 6/1975 | Kimura | 340/726 |
| 3,996,584 | 12/1976 | Plager . | |
| 4,070,662 | 1/1978 | Narveson | 340/726 |
| 4,129,859 | 12/1978 | Iwamura et al. . | |
| 4,141,003 | 2/1979 | Felsenstein . | |
| 4,342,991 | 8/1982 | Pope et al. | 340/726 |
| 4,360,831 | 11/1982 | Kellar | 340/747 |
| 4,386,410 | 5/1983 | Pandya et al. | 340/726 |
| 4,491,832 | 1/1985 | Tanaka | 340/721 |
| 4,574,279 | 3/1986 | Roberts | 340/745 |

FOREIGN PATENT DOCUMENTS 877603 of 0000 Belgium .
2839888 of 0000 Netherlands .

*Primary Examiner*—Marshall M. Curtis
*Attorney, Agent, or Firm*—Rodney M. Anderson; Leo N. Heiting; Melvin Sharp

[57] ABSTRACT

A system for displaying alphanumeric and graphic information on a raster scanned display device, for example, in a teletext system, includes a memory which is updated to change the display. Dynamic changes in the displayed image are provided by assigning a base address to each of one or more zones in the memory and altering the base addresses as required under local or remote control. Alphanumeric and graphic data may be combined on a single displayed page by means of identification data associated with each row or line of data to be displayed. The required capacity of the memory associated with the display device is substantially reduced by assigning a control code to data which is to be repetitively displayed, for example, spaces at the end of a line or fields of uniform color. Selected elements are thus displayed a predetermined number of times without the need for a corresponding number of memory locations. Incoming data may be stored in a buffer memory at a greater rate than can be processed by the present system by means of a control circuit which inhibits the inputting of data for a period of time when there is a risk of overwriting or erasure of previously stored data.

12 Claims, 8 Drawing Sheets

VIDEO DISPLAY CONTROL SYSTEM HAVING IMPROVED STORAGE OF ALPHANUMERIC AND GRAPHIC DISPLAY DATA

This is a continuation of Ser. No. 715,788 filed Mar. 25, 1985 now abandoned, which is a continuation of Ser. No. 328,777, filed Dec. 8, 1981, now abandoned.

BACKGROUND OF THE INVENTION

The present invention relates to the display of messages on a display device of the scanned raster type such as a cathode ray tube (CRT) used, for example, as a terminal in a data processing system. More particularly, the invention relates to the editing, the transmission and the reception of messages containing page composition data to be displayed on the screen of a CRT. A system for the embodiment of these operations is commonly called a "teletext" system.

There are, generally, two modes for displaying messages on a CRT, the alphanumeric mode and the graphic mode. Referring to FIG. 1 of the drawings, messages in the alphanumeric mode comprise a plurality of rows 1 of characters, each character being defined by a matrix 2 of N lines and M dots. The matrices are stored in one or more character generators which are formed by read-only memories or by corresponding zones of a composite memory associated with a CRT display controller. The character generators have addressable positions in which the data necessary to display each alphanumeric character are stored.

To display a page of text, the system includes at least one page memory which is a read/write memory (or RAM) for storing the codes of the alphanumeric characters to be displayed. Each character thus coded is formed of two parts, one of which is the character code, for example in ASCII code, and the other is an attribute code relating to the color, the background and other functions to be embodied when the character is displayed. FIG. 2 shows the configuration of the coded characters stored in a page memory. Each coded character 3 corresponds to an alphanumerical character in a row and is formed of an attribute code 4 and a character code 5. The coded characters are arranged in the memory in locations corresponding to those of the characters displayed on the screen.

Consequently, whenever a page composed of X rows of Y characters is to be displayed, the page memory contains XY coded characters. The successive addressing of these coded characters permits access to the character generator thereby producing the display. As this operation progresses, the image is built up on the screen by scanning of a raster composed of intersecting lines, as is well known in video technology. Since the matrices are composed of N lines, each row of characters is thus displayed by N successive addresses of all the matrices of characters in a row, this addressing being carried out at the line scanning rate of the CRT. After the display of a complete row, the following row is displayed line by line, like the preceding row.

In the graphics mode the character generator is not used. Instead, a page memory containing the page data in the form of separate dots 6 (FIG. 3) coded in binary fashion is employed. This code is a function code relating to the color or the shade of gray of the dot to be displayed. This method permits any form to be displayed on the screen within the limits of resolution dictated by the density of the dots on the screen. The dots are stored in locations corresponding to their position in the displayed image. The page memory is read line by line at the CRT line scanning rate.

By way of example, referring to FIGS. 1 and 2, each matrix 2 of characters stored in the character generator and is played on the screen is formed of $8 \times 10$ image dots ($M=8$, $N=10$), and each row contains 40 characters ($Y=40$). Moreover, each character 3 requires a character byte 5 and an attribute byte 4 for its identification in the page memory. Furthermore, each page contains 25 rows of alphanumeric characters ($X=25$). Under these conditions, in the alphanumeric mode, the page memory must have a capacity of $25 \times 40 = 2000$ bytes for the display of a complete page.

In the graphic mode a three-bit code may be used for each dot to provide for eight shades of gray or eight colors of a number of dots equal to that necessary for writing 40 matrices side by side. In this example, each line requires 960 bits, or 120 eight-bit bytes per line. For an equal number of image lines ($25 \times 10$), the page memory then stores 30,000 bytes, assuming the entire page contains graphic elements.

Because of the difference in the implementation of the display in the alphanumeric and graphic modes, it is not possible in prior systems to mix on a given page alphanumeric data and drawings, graphs or other forms composed of lines, because all of the data relative to the display of a given page must be stored beforehand in a page memory, so that it must be determined in advance whether the page is of an alphanumeric or a graphic nature. Thus, in order to add graphic drawings to a message of text, it is necessary to use separate pages for the alphanumeric portion and the graphic portion which requires a considerable increase in the capacity of the page memory. Further, in order to obtain an appropriate display, it may be required to load two page memories alternately, which would necessitate a memory with a minimum of 60K bytes in order to display in both the graphic mode and the alphanumeric mode on the same screen.

Another problem involved in graphic mode display is the relatively long time required for the receiving system to store the data in its page memory for display. Of course, the graphic mode also necessitates constraints at the sending level, because for a page in graphic mode the time required in the sending system is much longer than that required for sending a page in the alphanumeric mode. The graphic mode, therefore, considerably reduces the density of the data that can be transmitted per unit of time.

Yet another problem related to the implementation of teletext systems, and to data processing systems in general, is the exchange of data between two systems having different data processing rates, for example, a central unit and a terminal. Prior art systems have employed a plurality of registers used as a buffer between the two processing systems, the buffer operating in a first-in-first-out (FIFO) manner. However, this method is relatively high in cost, low in capacity and cannot be used unless the data processing rates do not differ too widely.

OBJECTS OF THE INVENTION

It is therefore an object of the present invention to provide a system for displaying messages on a raster scanned display device wherein said messages are superimposed on a composite video signal.

Another object of the present invention is to provide a system having both alphanumeric and graphic display capability which minimizes the display memory requirements associated therewith.

Yet another object of the invention is to provide a means for locally or remotely controlling the animation or scrolling of displayed images in a raster scanned display device.

Still another object of the invention is to provide a means for reducing the required page memory capacity in a display system by the repetitive display of selected elements of a message on a raster scanned display device.

Another object of the present invention is to provide a method and apparatus which permits the exchange of data between two systems having different data processing rates.

SUMMARY OF THE INVENTION

In one embodiment of the present invention messages to be displayed are transmitted in digital form by superimposing the data on a television type video signal. The messages are composed of pages to be displayed on a raster scanned display device on which the images corresponding to these pages are drawn by a line by line scanning. The data representative of the elements of each page is stored in a page memory in the form of a binary code and retrieved therefrom under the control of a time base circuit which is in turn controlled by synchronization pulses forming part of the transmitted video signal. The function of page memory in the present system is assigned to at least two zones in a memory unit, wherein each page memory zone is identified by a unique base address. Data is retrieved from the zones by means of composite addresses formed of the base address of the memory zone concerned and the address of the memory location from which, at a given moment, the data is to be retrieved by the composite address for display. In this manner, data is retrieved selectively from memory zones in the memory unit which contains more than one page of data. Further, the memory zone boundaries are variably defined and altered as necessary by modifying the base address thereof.

Particular zones of the memory unit are used as page memories while others are used as character generators. In the alphanumeric display mode the page memory contains addresses of locations in the character generator wherein the dot matrix codes for the various characters to be displayed are stored. In the graphic mode the page memory is accessed directly and stores the individual dot patterns for the particular graphic forms to be displayed. The present invention provides for the display of both alphanumeric and graphic elements on the same message page by means of row attribute bytes associated with each row of characters or graphic elements to be displayed. The row attribute bytes indicate, inter alia, whether the next line to be displayed will be alphanumeric or graphic.

The displayed images are animated or scrolled, on either a row or a line basis, by selectively and periodically altering the base address identifying the zones assigned to the page memory function, and periodically retrieving the display data from different page memory zones in the memory unit. The size of the page memory is substantially reduced by inhibiting the reading of the memory at selected locations and successively displaying the previously addressed data. Repetitive data, for example spaces at the end of a line of characters and fields of uniform color, may thus be displayed without storing the data a corresponding number of times in the page memory zone.

Provision is also made for the exchange of data between two computer systems having different data processing rates, for example, where one system sends data and the other receives data. Groups of data sent by the first system are successively stored in a dynamic memory under control of a first address pointer capable of successively addressing all the locations in a buffer memory. Stored data groups are read out at a slower rate by the receiving system under control of a second address pointer also capable of successively addressing all memory locations. The two pointers are continuously compared and, when an equality is detected, the sending system is inhibited to prevent the erasure of data groups not yet read out from the memory by the receiving system.

BRIEF DESCRIPTION OF THE DRAWINGS

Other objects and many of the attendant advantages of the present invention will be readily apparent as the invention becomes better understood by reference to the following detailed description with the appended claims, when considered in conjunction with the accompanying drawings, wherein:

DETAILED DESCRIPTION OF THE INVENTION

The present invention may be employed in any system wherein messages composed of pages of alphanumeric and graphic information are displayed, for example, a terminal of a computer or other data processing system.

By way of example, the present invention will be described as an application in a teletext system known an "Antiope." Reference should be made to the following publications for a detailed description of the Antiope system: "ANTIOPE LSI", P. Frandon and G. Chauvel, IEEE Transactions on Consumer Electronics, Vol. CE-25, No. 3, July 1979; an article by B. Marti and M. Mauduit in Radio Diffuision-Television, No. 40, 1975; Antiope specifications published by the Centre Common d'Etudes de Television et de Communications (CCETT).

Briefly, the Antiope teletext system includes a display terminal that can receive input data from a telephone line or from a television signal broadcast by a sending station and containing, in addition to the analog data relating to the video images built up by conventional fashion, data in binary form multiplexed on the video signal sent out in the intervals left open by conventional television standards, for example, SECAM, PAL, and NTSC.

Figure 4:
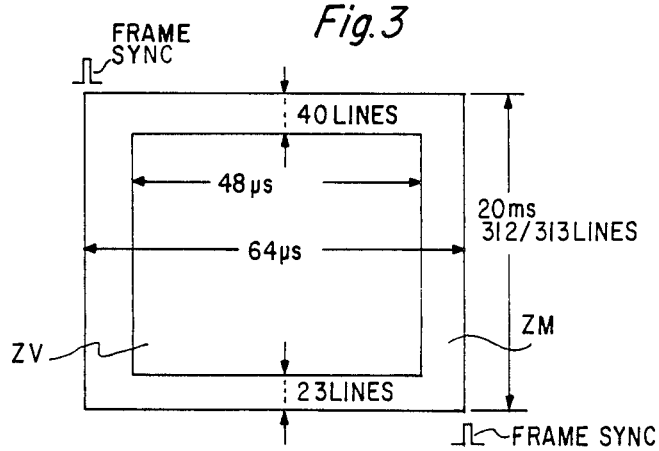
FIG. 4 is a diagrammatic representation of a display screen showing, in a video image transmitted according to conventional standards, the zone actually seen by an observer.

FIG. 4 of the drawings shows the configuration of a standard television raster in which the inner rectangle ZV corresponds to the zone actually visible on the screen, and the marginal space ZM corresponds, for example, to 40 lines at the top and 23 lines at the bottom of this zone which are visible. Thus, in such a video signal, each raster signal situated between two line synchronization pulses 7 contains a video part whose function is to trace a video image by the conventional analog video signal as well as a part, with a duration of twenty lines, for example, reserved for the transmission of the teletext by a signal in binary form.

Figure 5:
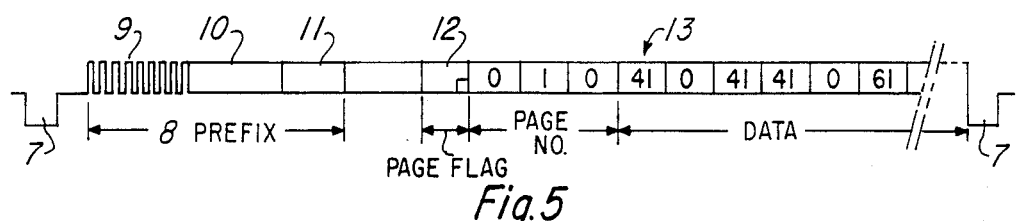
FIG. 5 represents an example of a signal relating to the data which can be utilized for the transmission of a line to a receiving set in a teletext system.

The time interval required to scan these lines is therefore occupied filled by a digital signal such as the one shown in FIG. 5, which represents the data that can be transmitted between two line synchronization pulses.

One advantage of the Antiope System over other known teletext systems is that the message transmission is completely asynchronous and independent relative to the display of data on the screen. The receiver is provided with means to demodulate, accumulate and display the received data in the proper manner independent of the flow of the data received.

Referring to FIG. 5, the signal or package of data transmitted between two line synchronization pulses 7 includes a prefix 8 formed by eight bytes broken down into the following elements:

A pulse train 9 to synchronize the oscillator of the receiver and serve as reference in the reconstitution of the next three bytes, A group 10 of three bytes to identify the data package as belonging to a given page magazine, A group 11 of two bytes containing an index of the number of successive packages (one byte) associated with the respective magazine, as well as a format index containing the total number of bytes in the package in question, which number can vary from one signal to another.

Figure 1:
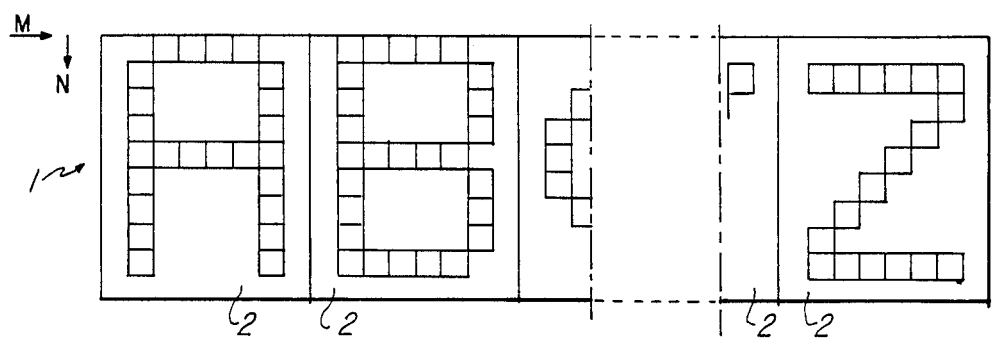
FIG. 1 is a diagrammatic representation of a row of alphanumeric characters formed of dot matrices stored in a character generator.
Figure 2:
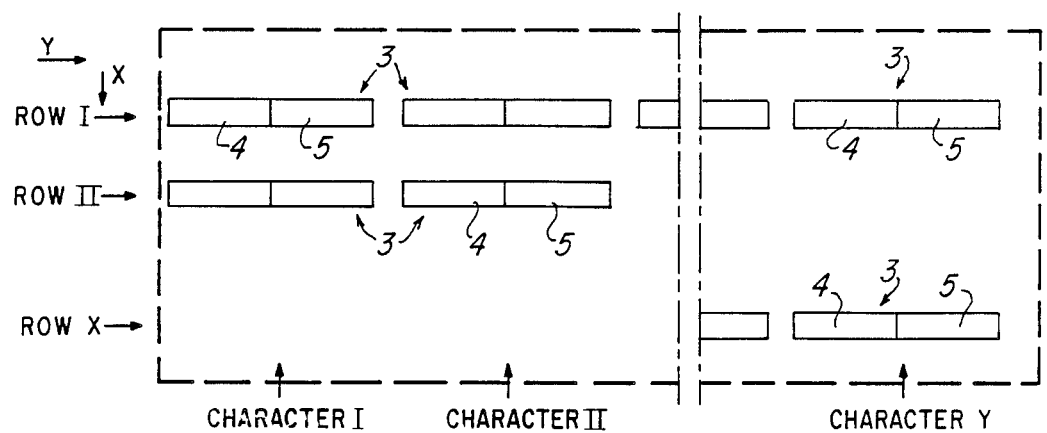
FIG. 2 is a diagrammatic representation of the storage in a page memory of the coded characters relating to the contents of the character generator of FIG. 1.
Figure 3:
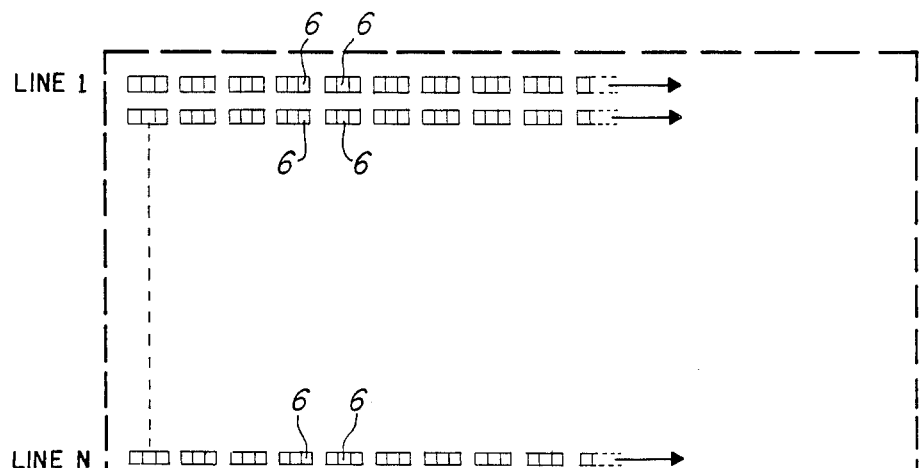
FIG. 3 is a diagrammatic representation of the storage in a page memory of the data relating to the graphic display mode.

The signal also includes 32 bytes od data, preceded by a page flag byte 12 indicating the number of the magazine page of which the data forms a part. The data 13 to be displayed is formed of bytes representing, in the case of the alphanumeric mode shown in FIG. 2, a standard character code such as ASCII and an attribute code designating certain characteristics of the character to be displayed, for example, color.

Figures 6, 7:
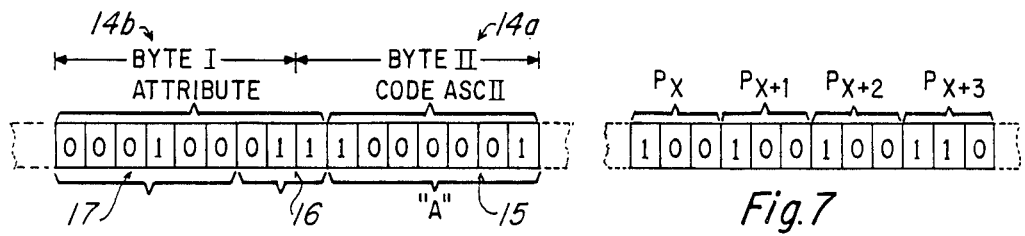
FIG. 6 is a diagrammatic representation of the contents of a coded character stored in a page memory in the alphanumeric mode.
FIG. 7 shows a simlilar scheme for the storage of data in the page memory in the graphic display mode.

Referring to FIG. 6, the character "A" can be transmitted in the form of two bytes 14a and 14b containing, from right to left, the ASCII code 15 (100-0001) an attribute code 17 which can be, for example, the color or size of the character, and a line number code 16. The character data can alternate with data relating to the background of the image or other elements of the message, such as the space code, a line code in the case where lines of the image are to be skipped, and the like. The codes contained in each interval between two line synchronization pulses are, in the alphanumeric mode, coded characters to be stored in a page memory cooperating with one or more character generators used for display on the screen.

FIG. 7 represents graphic mode data that can be transmitted and interpreted by the receiver. Each image dot $Px$, $Px+1$, $Px+2$, $Px+3$ ... is transmitted in the form of a 3-bit code designating the value of a scale of the primary colors or of shades of gray. On reception this data is stored in the page memory to be displayed without the aid of character generators.

Figure 10:
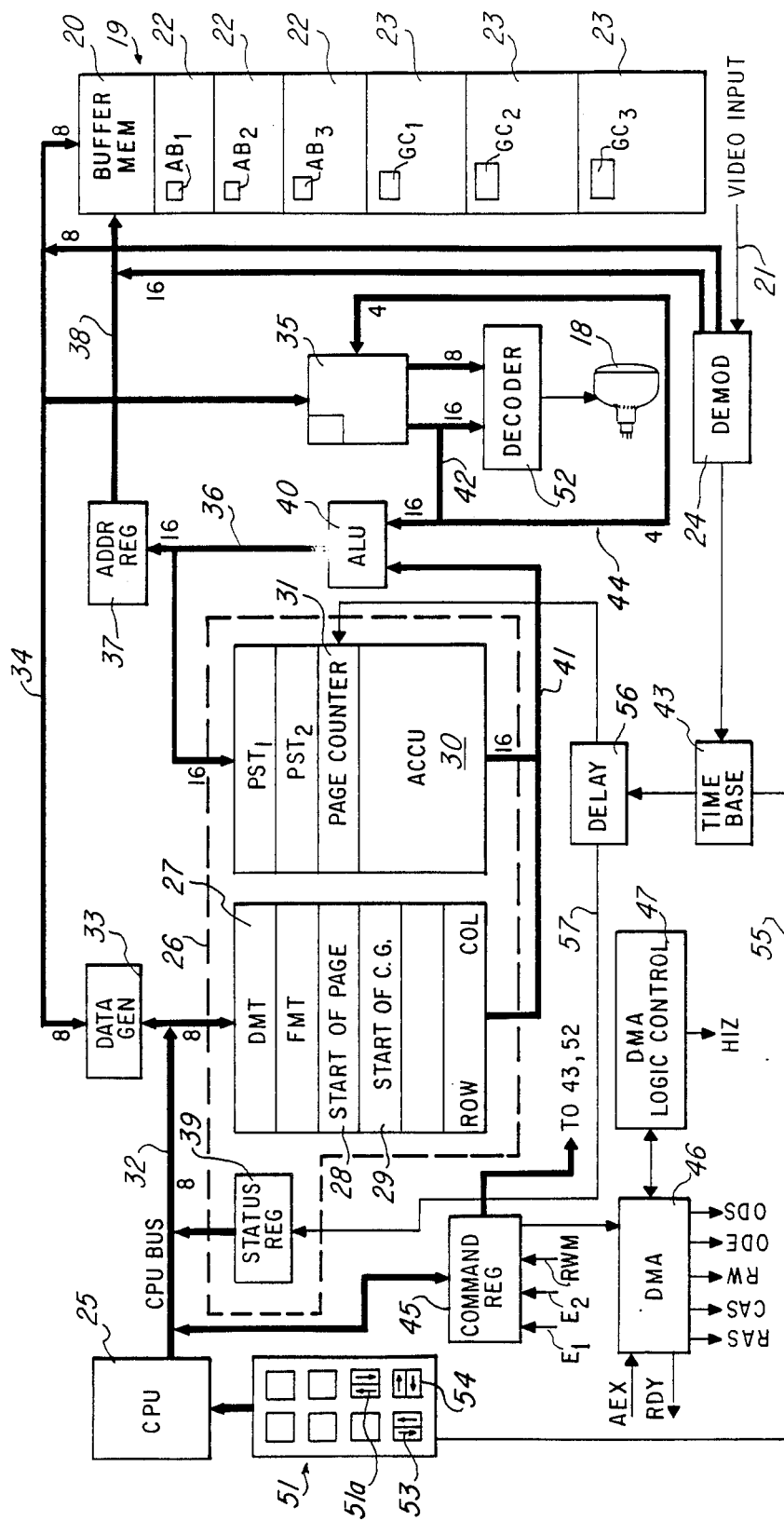
FIG. 10 is a block diagram of a system for displaying pages of data in a teletext system.

Referring now to FIG. 10, there is shown a portion of a receiver in an Antiope teletext system capable of separating the binary data corresponding to the teletext from the video signal, and transforming this data into images displayed on a CRT 18.

According to the present invention, the receiver or terminal includes a memory unit or composite memory 19, the various zones of which are assigned to the storage of data of various kinds. Memory unit 19 includes a zone that constitutes a buffer memory 20 for temporary storage of the input data separated from the video signal 21 applied to the terminal. The buffer memory and its ancillary circuits will be described in more detail below.

Memory unit 19 also includes page memory zones 22 for storing pages of data to be displayed, and character generator zones 23 for storing character data. Character generator 23 may be a read-only memory (ROM) while page memory 22 and buffer memory 20 are read/write (or RAM) memories.

The multiplexed video signal 21 is applied to a separator circuit or demodulator 24 to separate the teletext data from the video signal. One such demodulator is described in the second article cited above. The management of the data coming from buffer memory 20 is controlled by a central processing unit CPU 25 and its associated peripheral circuits. CPU 25 processes that part of the packages of data containing the display data, that is, the alphanumeric and graphic data.

A control circuit 26, shown by dashed lines in FIG. 10, manages the contents of buffer memory 20. Registers DMT—start of buffer memory 20; and FMT—end of buffer memory 20—form part of a battery of registers 27, also containing other registers for storing addresses relating to other zones in memory unit 19 as will be explained in more detail below. For example, there is a start-of-page address register 28, and one or more start-of-character generator address registers 29. There is, in addition, an accumulator 30 containing counters or pointers $PST_1$ and $PST_2$ for buffer memory 20, as well as other counters such as a counter 31 of pages of the magazine transmitted.

The battery of registers 27 is connected to a CPU bus 32 connected to a data register 33, which is connected in turn by a bus 34 to memory 19, to demodulator 24 and to a processor 35 for processing alphanumeric and graphic data to be displayed on the CRT 18. Processor 35 also controls the display of repetitive message elements on the CRT. Accumulator 30 is connected to an address bus 36 coupled to an address register 37 which is connected in turn to the address input of memory unit 19 by a bus 38. A status register 39 is connected to bus 32 which is coupled to CPU 25.

The present system also includes an arithmetic and logic unit ALU 40 whose function is to modify the addresses to be sent to memory unit 19 from registers 27 and from accumulator 30 by a bus 41, and from processor 35 by a bus 42 carrying the addresses in ASCII code of the characters stored in the character generators 23 of memory unit 19. A time base circuit 43 connected to demodulator 24, and to various other circuits as shown in FIG. 10 by bus 44, synchronizes the operation of all circuits.

A command register 45 controls the writing of data into the appropriate registers, and a direct memory access circuit DMA 46 controls the access to memory 19 by the various elements of the display system while avoiding possible interaction therebetween. A detailed description of DMA 46 is provided in U.S. Pat. No. 4,240,138 to G. Chauvel, entitled "System For Direct Access To A Memory Associated With A Microprocessor." Control logic circuit 47 is associated with DMA 46 as described in the above patent.

Figure 8:
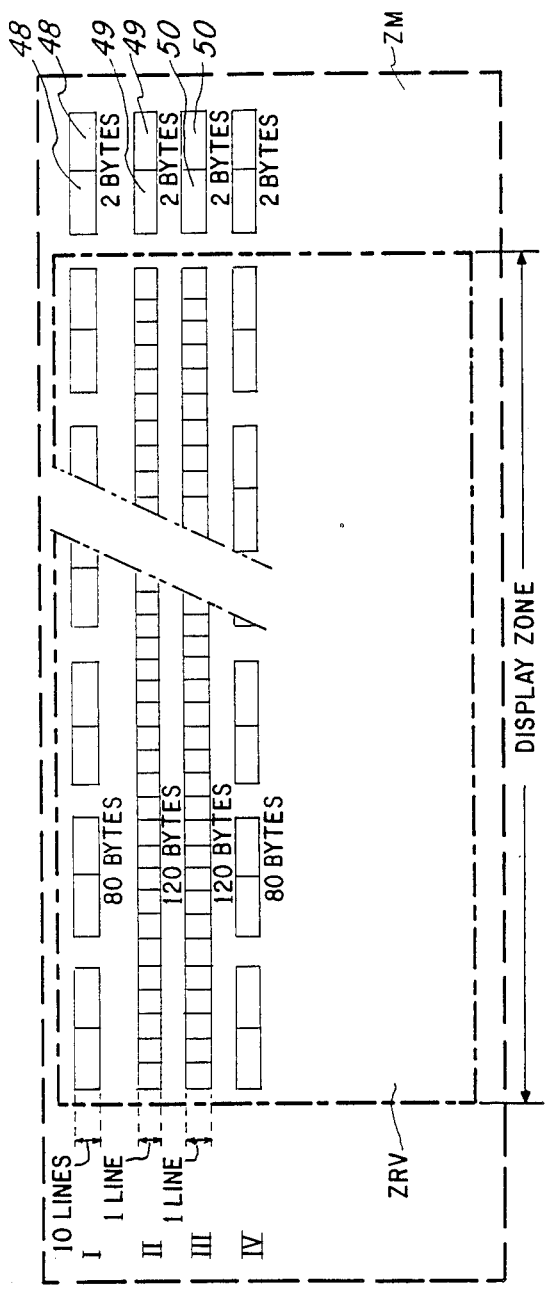
FIG. 8 is a diagrammatic representation of the storage in the memory of a page of data including both alphanumeric and graphic elements according to the present invention.

Referring now to FIG. 8, there is shown an example of the contents of a page memory 22 which receives data from buffer memory 20 under the control of circuit 26. In the example represented, the page to be displayed has an alphanumeric part as well as a graphic part, each distributed over a certain number of image lines. Thus, the page memory 22 has a first row I of alphanumeric addresses, each formed of an attribute byte and an ASCII code byte corresponding to a character to be displayed. Row I therefore contains 80 bytes and, on the screen, the row of characters displayed occupies ten image lines. The bytes thus stored in the page memory 22 control a character generator 23 in the manner described above, and relate solely to the zone actually visible on the screen, indicated by ZRV. The visible image is bordered by margin zones ZM so that each row of addresses in the page memory can include a part containing, for example at the end of a row, a memory zone in which bytes can be arranged. This concept is utilized in the invention to identify the nature of the next row of addresses contained in the page memory. These row attribute bytes are contained in the signal which was described above in regard to FIG. 5, and they are interpreted by the circuits of the receiver to control the alphanumeric and graphic display modes of the system. Bytes 48 therefore identify the nature of the following row of page memory addresses which, in this example, is a graphic row.

Row II is composed, insofar as the zone ZRV is concerned, of 120 bytes which account for three bits of data for each of 320 image dots to be displayed. At the end of row are two attribute bytes 49 relating to the display of the following row III which here again is of a graphic nature, and which likewise has 120 bytes and terminates in two attributes bytes 50. The latter, in the example, determine the following row IV which is alphanumeric. It is thus possible to store a page of teletext in a page memory which contains both alphanumeric and graphic elements up to the total capacity of the page memory.

It is possible, in view of the interval of time available during the line scan on either side of the visualized zone ZRV, to include additional bytes at the end of the respective rows. Since this time interval totals 24 $\mu$sec, up to 48 bytes can be included as required. The additional bytes can be used to hold data or instructions other than those relating to the modes of display, for example, a color code for the next row to be displayed; a means of display superposed on a video image transmitted by the television channel in analog form, such as sub-titles of films; a repetition factor of a row which is thus to occupy a large part of the screen; or a code making it possible to change the characteristics of the image, such as a complete change of background.

An advantage of the present system is the reduction in the memory capacity required, as well as the capability of displaying both alphanumeric and graphic elements on a CRT page as required. The row attribute bytes may be at either the beginning or the end of a row as long as they are inserted before the row whose characteristics they determine.

To illustrate the reduction in memory capacity that can be achieved, assume that the CRT has 250 lines for displaying 25 rows of 40 alphanumeric characters or 250 lines of graphic dots and, further, that each character matrix is formed of 8×10 image dots. A system according to the prior art, to display both alphanumeric and graphic elements, would require two separate pages. The graphic page alone necessitates a page memory capacity of 30,000 bytes (120 bytes/line×250 lines).

Assuming one-fifth of the display screen is occupied by graphic elements, i.e., 50 lines, there are 200 lines of alphanumeric elements, or 20 rows of 40 characters. Assuming further that each row or graphic line includes two row attribute bytes, the page memory must have sufficient capacity to store 1640 alphanumeric bytes and 6100 graphic bytes, or a total of 7740 bytes as compared to the 30,000 bytes required for the graphic elements alone in prior systems.

Figure 9:
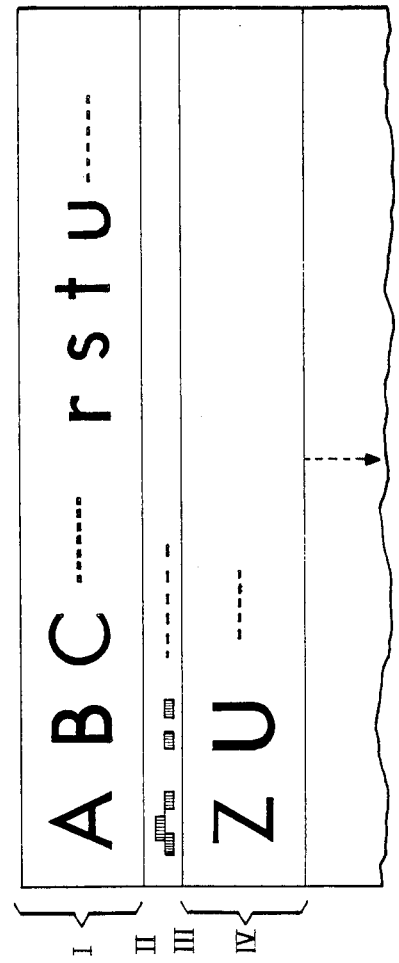
FIG. 9 shows an image as it appears on a display device, corresponding the data stored in the page memory of FIG. 8.

FIG. 9 shows rows I–IV as displayed on the CRT screen for a configuration of message elements corresponding to the contents of the page memory according to FIG. 8, with one row of characters, two rows of graphic elements and then another row of characters.

Figure 11:
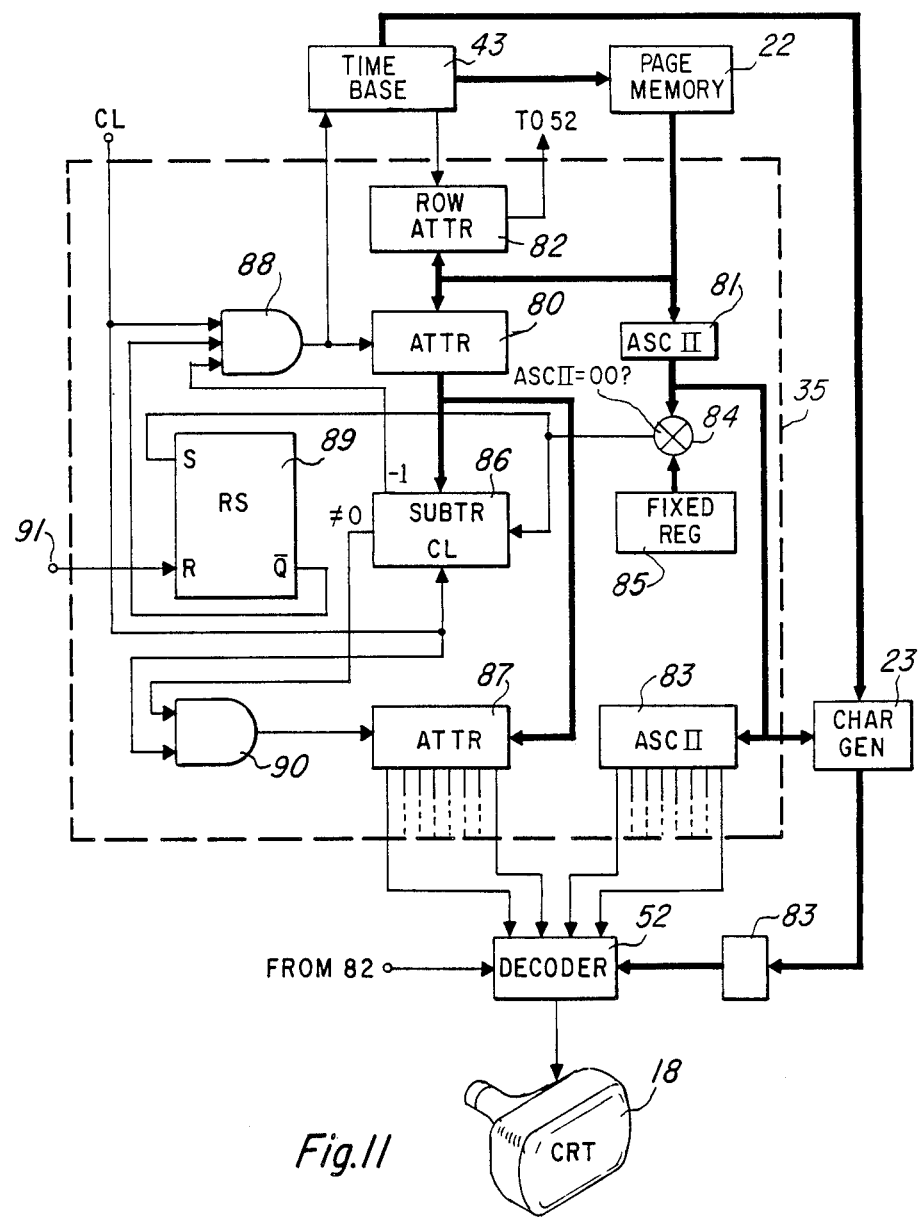
FIG. 11 is a block diagram of a subsystem for the exchange of data between two processors having different data processing rates according to the present invention.

FIG. 11 is a block diagram of the processing device 35 represented in FIG. 10 for interpreting row attribute bytes 48 to 50. Page memory 22 communicates with the time base circuit 43 and the arithmetic and logic unit ALU 40 by means of address register 37 (shown in FIG. 10). The data retrieved from page memory 22 is loaded into a register 80 in which the attribute data is stored, a register 81 which receives the ASCII code data also applies it to the character generator 23, and a register 82 for identification of the display mode, i.e., the row attributes. The outputs of these registers are connected in one embodiment to a decoder 52 which converts the data received into appropriate signals for display on CRT 18. The character generator 23 is connected to decoder 52 by means of a dot register 83 for displaying the lines of character matrices 2 as described above.

Time base circuit 43 sends register 82 a margin validation signal at the moment when the non-visible zone ZM is reached in the course of the scanning of the screen. In other words, this margin validation signal is furnished at the end of the display of the tenth line in a row of alphanumeric characters or at the end of the display of a line of graphic dots.

The row attribute bytes in register 82 can include, aside from the data on the mode of display, data defining the color of the margin of the image, or data on the masking of the following line or row, for example. The second byte can include, for example, a "window" of shades of gray, also assigned to the margin.

Referring again to FIG. 10, in one configuration memory unit 19 has three zones 22 of page memory and three zones 23 of character generators. This configuration can be fixed, or it can vary according to the display requirements. Each of the memory zones 22 can be assigned a base address $AB_1$, $AB_2$ and $AB_3$, for example, identifying the upper left-hand position in the zone. It will be seen that if this memory is addressed with address value $AB_1$, OAOO, for example, in hexadecimal code, the data stored in this particular location is retieved therefrom. All the locations in this zone can be addressed successively by incrementing the base address with the value of the location in the zone. Assuming that this page memory zone has 2000 bytes, the base address $AB_2$ can have the value of 1100, and all the positions in this second zone can be addressed by raising this address value by the value of the location concerned.

In other words, it is possible to scan the first zone from the base address $AB_1$, and then the second zone from base address $AB_2$ by altering the value of a counter 28 in the battery of registers 27. The same is true for base address $AB_3$. It is thus possible to select a base address which is between base addresses $AB_1$ and $AB_3$, permitting the display of a page that partly covers two pages defined by any one of base addresses $AB_1$, $AB_2$ and $AB_3$.

Character generators 23 are similarly addressed i.e., by assigning each zone a base address $GC_1$, $GC_2$, $GC_3$ identifying starting positions of the corresponding memory zones.

The size of each memory zone can vary as the operation proceeds, depending on their load, because the base addresses are easily altered by means of page-memory-start and character-generator-start counters 28 and 29.

Further, it is possible to transfer from one page memory to another by simply changing the base address. Animation in the cinematographic sense is achieved by a slight change in the contents of the page memories, by addressing them successively from their base addresses. In addition, by loading a continuous message partly in the successive zones 22 of memory unit 19, which exceeds the capacity of at least one zone, the text may be scrolled, thus causing a row at the top of the screen to disappear and adding another line thereto at the bottom of the screen.

The variations of the base address of the memory zones can be obtained in various ways. For example, they can be contained in the input signal 21 and be interpreted after separation in circuit 24 by CPU 25 which controls the changing of page-memory-start counter 28. This applies in particular when the image to be displayed is animated in the cinematographic sense. When the text is scrolled row by row or line byline, it is preferable to provide a local command generated by means of a keyboard 51 available to the user, and conndress of the memory zones can be obtained in various ways. For example, they can be contained in the input signal 21 and be interpreted after separation in circuit 24 by CPU 25 which controls the changing of page-memory-start counter 28. This applies in particular when the image to be displayed is animated in the cinematographic sense. When the text is scrolled row by row or line by line, it is preferable to provide a local command generated by means of a keyboard 51 available to the user, and connected to CUP 25. It is desirable for keyboard 51 to include a key 51a to enable row-by-row scrolling, thus producing a vertical movement by rows in the alphanumeric mode. A key 53 is provided to command line-by-line or "smooth" scrolling of the displayed image in either the alphanumeric or the graphic mode. Key 54 enables the horizontal movement of the displayed image.

In the alphanumeric mode, when key 51a is depressed, the base address of the respective page memory 22 is increased by the number of bytes required for the display of a row of characters, i.e., 80 bytes. Each such increase has the effect of removing a row at the top of the CRT screen and adding one at the bottom. Stated another way, the associated page memory zone moves in memory unit 19. When the procedure is reversed, i.e., subtracting 80 bytes from the base address, the displayed page is scrolled vertically in the opposite direction.

The successive altered values of the base address are loaded into base register 28 at a rate as determined by CPU 25. This rate can be varied from keyboard 51. It will be noted that the scrolling function does not require the scrolled page to be stored again in memory unit 19.

If the message is entirely graphic, the image may be scrolled line by line by offsetting, each time, the base address loaded in register 28 by a value of 120 bytes in the above example. A more uniform scrolling is obtained if the loading of the base address is delayed by the interval required to trace one or more lines on the CRT. Referring to FIG. 10, this function is enabled by applying raster synchronization pulses from time base circuit 43 to the status register 39 by means of a conductor 55. CPU 25 will then offset the loading of the base address into register 28, the start-of-page register. The amplitude and pace of the delay may be controlled from keyboard 51 which is coupled to one input of a delay circuit 56 by means of a conductor 57. Time base 43 is coupled to another input of delay circuit 56, whose output is coupled to page counter 31 in accumulator 30. This feature is applied in both the alphanumeric and graphic display modes.

When the horizontal scrolling function is enabled by key 54, the base address of the displayed page is offset by a number of bytes between 0 and 80 if the row is alphanumeric, or between 0 and 120 if the row is graphic.

Referring again to FIG. 11, subsystem 35 will now be described in greater detail. This subsystem uses control codes, transmitted with the data to be displayed, to inhibit the reading of page memory 22 at selected locations and thus maintain the previous information at the inputs to decoder 52. This is particularly advantageous in the case of repetitive message elements, for example, spaces and fields of uniform color. A substantial reduction in the size of page memory 22 can be achieved since the element to be repeated occupies only two memory locations.

The data retrieved from page memory 22 is loaded, in the case of ASCII code, into an ASCII code register 81, and in the case of the attribute code, into an attribute register 80. The output of register 81 is connected to a second ASCII code register 83, to character generator 23, and to the first input of a comparator 84. The second input of comparator 84 is connected to a fixed register 85 which stores in ASCII code a repetition code.

The attribute data in register 80 is applied to a subtractor 86 as well as to a second attribute register 87 connected to decoder 52. Register 80 loads subtractor 86 with a number corresponding to the number of repetitions to be made.

A first AND gate 88 has three inputs and receives a clock signal CL, for example, 1 μsec., at its first input, a signal from output (−1) of subtractor 86 at its second input, and the $\overline{Q}$ output of a RS flipflop 89 at its third input. The output of AND gate 88 is connected to attribute register 80 and to time base circuit 43.

A second output of subtractor 86 is connected to one input of a second AND gate 90, and the other input is connected to clock signal CL. Its output is connected to attribute register 87. Clock signal CL is also connected to the clock input of subtractor 86.

The output of comparator 84, activated in the event of equality of its two inputs, is connected to subtractor 86 and to the set input S of RS flipflop 89, whose reset input R is connected to a line synchronization signal 91.

In operation, time base circuit 43 causes the addressing of page memory 22 from which the attribute data and ASCII code are retrieved. This data is normally transferred to decoder 52, either by means of register 87 for attribute data, or by means of character generator 23 and register 83 for character data.

The content of register 81 is compared continuously with that of fixed register 85 which contains the repetition code. When the values are equal, the repetition value introduced at this moment into attribute register 80 is loaded into subtractor 86, whose output (−1) inhibits, through AND gate 88, the application of clock signals CL to time base circuit 43 and to register 80. As long as the AND gate 88 receives the (−1) signal from subtractor 86, time base circuit 43 can not cause the addressing of page memory 22, during the entire period of the subtracting.

During this period, registers 83 and 87 retain the value of the ASCII code and that of the attributes which preceded the moment of equality of the values in registers 81 and 85, so that the signal corresponding to the ASCII code is displayed on CRT 18 under the conditions determined by the attribute values stored in register 87 during the entire period of subtraction by subtractor 86. Register 87 is inhibited by AND gate 90 by means of the signal from subtractor 86. When subtractor 86 reaches the value (−1), page memory 22 is again addressed by the enabling of AND gate 88. The display can then continue on the basis of the codes contained in page memory 22. Register 85 contains an ASCII code, for example "00", which causes repetition. This code is not displayed on the screen because as soon as subtractor 86 reached the value (−1), new codes are loaded into registers 80 and 81.

The operation described above relates to the case where the repetition on the screen does not occupy the full width of a row, in alphanumeric or graphic mode. The number of repetitions is determined by the repetition code which, when loaded into register 81, causes the addressing of page memory 22 to be inhibited.

If the repetition is to continue to the end of a line or row on the screen, the line synchronization pulses 91 are employed. When the repetition code, "00" in ASCII code, for example, is loaded into register 81, comparator 84 sets RS flipflop 89 which blocks AND gate 88, thereby preventing the addressing of page memory 22. The data from registers 83 and 87 are therefore displayed repetitively until the line synchronization pulse 91 resets RS flipflop 89 to its initial state. Thus, a reduction in the size of page memory 22 is achieved because the data corresponding to a sequence of identical characters or dots to be displayed requires only two memory locations. For example, an empty row beginning with an ASCII "space" code (00), followed by a repetition code, requires the storage of only four bytes, while in prior systems 80 bytes were needed to cause the display of 40 spaces in a row. In graphic mode the same principle can be applied, for example, when a row of dots is to be of a uniform color.

Figure 12:
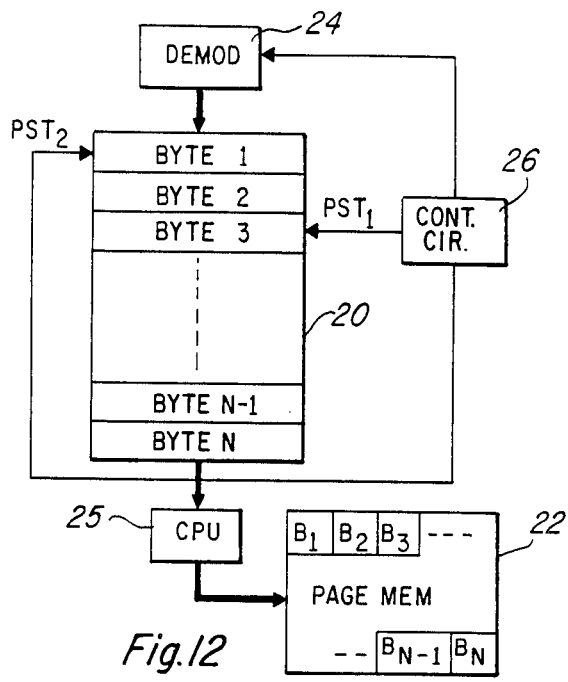
FIG. 12 is a more detailed diagram of the subsystem of FIG. 11.

In the foregoing description of the present invention as applied to a teletext system, the data extracted from video signal 21, referring to FIG. 10, is inputted into buffer memory 20 at a much faster rate than it can be read and processed by CPU 25. This difference in data rates between the demodulator 24 and CPU 25 is accomodated by means of buffer memory control circuit 26, represented by the dashed lines in FIG. 10. The operation of circuit 26 may best be understood by reference to FIG. 12, which shows the pointer scheme of the present invention in simplified block diagram form.

Data from demodulator 24 is written into buffer memory 20 while data previously stored therein is retrieved by CPU 25 and thereafter written into a page memory 22. Under control of circuit 26, the locations in buffer memory 20 are successively addressed by two pointers $PSt_1$ and $PSt_2$ which are registers associated, respectively, with CPU 25 and demodulator 24. The registers are incremented by one unit each time its associated processor calls for a transfer of data to or from buffer memory 20. When a pointer contains the address of the last location in memory 20, its associated processing system reloads it with the address of the first location so that all locations may be addressed again and successively. Since the processing rates of CPU 25 and demodulator 24 are different, the pointers are not incremented at the same rate, so that $PSt_2$ can under certain conditions catch up on the address contents of $PSt_1$.

Thus, when the contents of the two pointers are equal, control circuit 26 prevents the overwriting and loss of data in buffer memory 20. Signal DEB is generated when the equality signal has occurred and pointer $PSt_2$ has reached the last location in memory 20.

In certain cases, it may suffice to generate only the first signal in order to indicate that the contents of the two pointers are equal, for example, if there is substantial buffer memory 20 capacity, or if the difference in data processing rates is small. Under these conditions, the probability that $PSt_1 = PSt_2$ with one turn ahead will be low, and hence there is little risk of loss of data stored in buffer memory 20. But, if the capacity of buffer memory 20 is limited and/or if the difference in processing rates is substantial, signal DEB may be be required. When detected, the signal DEB momentarily inhibits the writing of data from demodulator 24 into the memory 20, until CPU 25 has had time to empty memory 20 of its contents.

Figure 13:
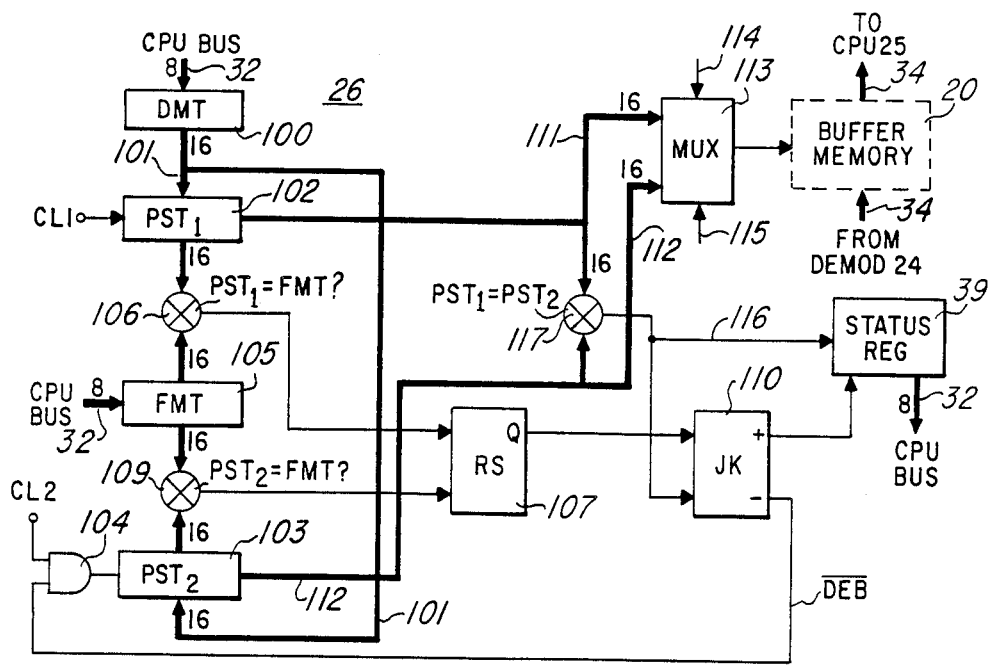
FIG. 13 is a block diagram of a subsystem according to the present invention for controlling the display of selected repetitive characters and for the combining of alphanumeric and graphic elements on a displayed page.

Refering to FIG. 13, circuit 26 will now be described in more detail. CPU 25 is connected by means of CPU bus 32 to a register DMT 100 for storing the starting address of buffer memory 20. The starting address (DMT) can be at any location in composite memory 19, of which buffer memory 20 forms only one zone. Further, address DMT can vary in the course of operation of the present system, i.e., the size of buffer memory 20 can vary dynamically, the output of register DMT 100 is connected to a bus 101 which is connected in turn to an address counter 102. Counter 102, which is incremented by a clock signal CL1 from CPU 25, constitutes pointer $PSt_1$ in FIG. 12. Bus 101 is also connected to an address counter 103 which is loaded at the start of operation with the address contained in register DMT 100. Counter 103 constitutes pointer $PSt_2$ associated with demodulator 24 through an AND gate 104. At the start of operation, an end-of-memory buffer address (FMT) is loaded into a register FMT 105 by means of the CPU bus 32.

A first comparator 106 is connected so as to be able to compare the contents of counter 102 and register 105. The output of comparator 106 is connected to a RS flip-flop 107 through a conductor 108. A second comparator 109 is connected between register 105 and counter 103 to compare the contents of thereof. The output of comparator placed in a first state in the event of equality between $PSt_1$ and FMT, and in the opposite sate when $PSt_2$ equals FMT. A third comparator 117 is connected between counter 102 and counter 103 by busses 111 and 112, respectively. When $PSt_1 = PSt_2$, comparator 117 outputs a signal on conductor 116 to a JK flip-flop 110 and to status register 39.

RS flipflop 107 and JK flipflop 110 together perform an AND logic operation on signals ($PSt_1 = PSt_2$) and ($PSt_2 = FMT$) to indicate a risk of overwriting the data in buffer memory 20. Address busses 111 and 112 are connected to the inputs of an address multiplexer 113 whose output is connected to the address input of buffer memory 20. This multiplexer 113 coordinates the addressing of memory 20 by busses 111 and 112, in an alternating manner. Multiplexer 113 also has two command inputs 114, 115 alternately enabled by sdignals generated as a function of the read and write cycles of CPU 25 and demodulator 24, respectively.

In operation, control circuit 26 is initialized by loading into registers 100 and 105 the address values DMT and FMT as determined by CPU 25. The output of comparator 117 initially indicates the state ($PSt_1 = PSt_2$), which remains constant as long as no data is loaded into memory 20. The data coming from demodulator 24 is loaded into memory 20 by using the addresses in register 103 (pointer ($PSt_2$)), which in turn is incremented by clock signal CL2 through AND gate 104 which is enabled by means of the signal $\overline{DEB}$. Buffer memory 20 is loaded as a function of the state of multiplexer 113, i.e., when the latter is connected to bus 112 by the command signal 115. Once data has been stored in memory 20 according to this procedure, comparator 117 indicates to CPU 25 through conductor 116 and status register 39 that the two pointers $PSt_1$ and PSt 2 are no longer equal. CPU 25 then reads the data in memory 20 using the addresses in counter $PSt_1$, which is incremented by clock signal CL1. Command signal 114 is incremented by clock signal CL1. Command signal 114 causes multiplexer 113 to connect bus 111 to memory 20 during the read cycle. CPU 25 reads the data in memory 20 until comparator 117 indicates to it by status register 39 that there is equality between the two pointers $PSt_1$ and $PSt_2$ and hence that memory 20 is empty, i.e., counter 102 has caught up with counter 103.

In the course of operation, the outputs of counter 102 and register 105 are compared continuously by comparator 106 which outputs a signal when the contents of the two are equal, i.e., when $PSt_1 = FMT$. Similarly, counter 103 is continuously compared with register 105 by comparator 109, which outputs a signal when $PSt_2 = FMT$. If in the course of operation $PSt_l = FMT$, the value DMT is reloaded into counter 102 and CPU 25 loops back and starts reading at the beginning address of memory 20. Similarly, if $PSt_2 = FMT$, the data from demodulator 24 is looped back, independently of the reading by CPU 25, and written in the beginning location of memory 20. If the rate of storage of data from demodulator 24 is such that counter 103 catches up to counter 102, there is a risk of overwriting of data as soon as $PSt_l = PSt_2$, since CPU 25 has not had time to read the data previously stored. The system will then inhibit the writing of data into memory 20 in the following manner.

RS flipflop 107 is set by comparator 109 when ($PSt_2 = FMT$) and restored to its initial state by comparator 106 when ($PSt_1 = FMT$). If the contents of counters 102 and 103 become equal in the set state of RS flipflop 107, i.e., $PSt_l$ is not yet equal to FMT, demodulator 24 will be ahead of CPU 25. Under these conditions a signal $\overline{DEB}$ is applied to AND gate 104 which inhibits the addressing of memory 20 by counter 103. When comparator 117 again detects an equality between counts 102 and 103, indicating that the buffer memory 20 has been read by CPU 25, AND gate 104 is enabled and counter 103 resumes operation. AND gate 104 may also be enabled by a zero reset signal applied to JK flipflop 110 by CPU 25.

In the preceding example the initialization of the system, and the loading of registers 100 and 105 are carried out by CPU 25, which also directs the data flow over the various system busses. These tasks may, of course, alternatively be assigned to circuitry in demodulator 24 by an appropriate adaptation.

Figure 14:
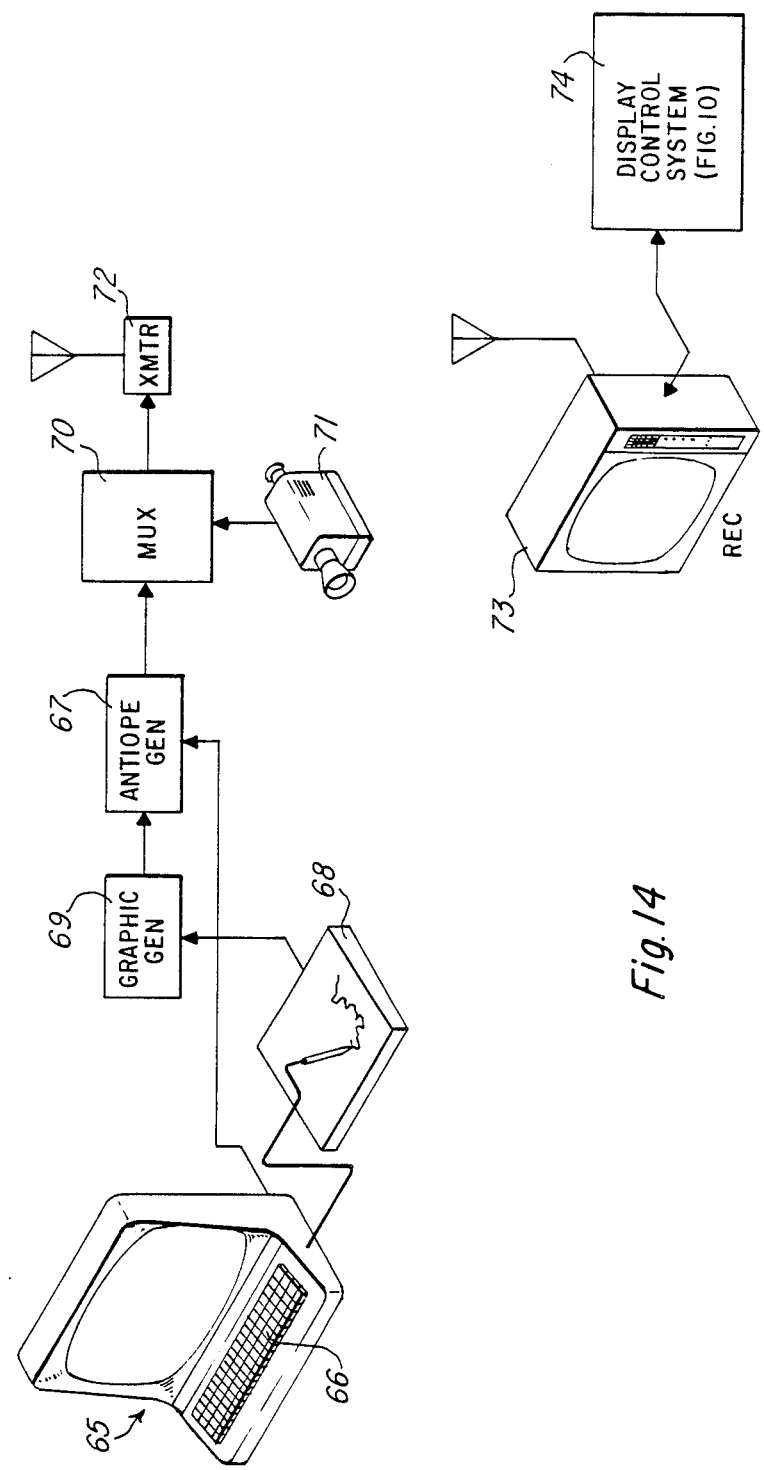
FIG. 14 is a diagrammatic representation of a system for the transmission and reception of teletext data according to the present invention.

FIG. 14 shows one embodiment of a system for the transmission of teletext data including the present invention. At the sending end there is a terminal 65 including a keyboard 66 for composing alphanumeric messages, as known in the art, coupled to a generator 67 for coverting the data, for example, to an Antiope format as described in the cited publications. A graphic composition device 68 is also coupled to terminal 65 and to a graphic generator 69, which is coupled in turn to generator 67. Data in the proper format as shown in FIG. 5 is sent from generator to a multiplexer 70 where it is mixed with a video signal from, for example, a video camera 71. Multiplexer 70 is coupled to a transmitter 72 where the multiplexed signal is broadcast as a television signal.

At the receiving end a television receiver 73 equipped with a system 74 according to the present invention, as shown in FIG. 10, demodulates and displays the video and/or teletext messages as described above.

Thus, there is provided by the present invention a display control system that may be included, for example, in a teletext system. Alphanumeric and graphic data may be combined on a single displayed page with a substantial reduction in the necessary capacity of the display or page memory. Means are also provided for adapting the data processing rate of the display control system CPU to the rate of incoming data as detected, for example, from a television signal. In addition, the present invention provides for the scrolling and/or animation of the displayed image responsive to local control or in response to a control signal from a sending system.

Other embodiments and modifications of the present invention will readily come to those of ordinary skill in the are having the benefit of the teachings in the foregoing description and drawings. It is therefore to be understood that this invention is not to be limited thereto and that said modifications and embodiments are intended to be included within the scope of the appended claims.

I claim:

1. A display control system comprising:
   a first memory means including a plurality of address registers for storing therein page start addresses;
   a second memory means including a plurality of page memories, each page memory starting at an address corresponding to the page start address stored in a corresponding address register of said first memory means and having stored therein display data for controlling a page of display, said display data stored in memory zones corresponding to video lines in one of a predetermined set of display modes, said display modes comprising a character mode and a graphics mode, wherein said character mode display data is stored in the form of address words, and wherein said graphics mode display data is stored in the form of a dot pattern, said page memories having further stored therein display mode data which identified the display mode corresponding to individual video lines;
   a data processor means connected to said first and second memory means for recalling display data from page memories of said second memory means in accordance with page start addresses stored in said first memory means, said display data thereby recalled in the order of display;
   character generator means, coupled to said data processor means and to said second memory means, for storing display data in the form of dot pattern character representations representing a plurality of alpha-numeric characters in locations addressable according to the address words recalled by said data processor means in the character mode; and
   a video control means connected to said second memory means of receiving said recalled dot pattern graphic display data in the graphics mode, and connected to said character generator means for receiving said dot pattern character representations corresponding to address words recalled in the character mode, said video display generator for generating video signals in accordance with said received dot pattern character representations and said dot pattern graphic display data.

2. The display control system of claim 1, further comprising:
   a video display means connected to said video control means for producing a visually perceivable image corresponding to said video signals.

3. The display control system of claim 1, wherein:
   each of said memory zones corresponding to a video line includes display mode data stored at the end thereof, said display mode data identifying the display mode of the next succeeding video line.

4. The display control system of claim 1, wherein said video control means further includes means for selectively displaying alphanumeric and graphic elements on a single displayed page of data comprising:
   decoder means coupled to said character generator means, to said second memory means and to said video display means for providing the received dot pattern character representations and the received dot pattern graphic display data to said video display means at the raster scanning rate; and
   mode control means coupled to said second memory means, said character generator means and said decoder means for interpreting display mode data stored in said second memory means which identifies the next successive data to be displayed as either a row of alphanumeric characters or a line or graphic elements, wherein said mode control means provides a signal to said decoder means enabling the display of data in the identified display mode.

5. The display control system of claim 4, wherein said mode control means comprises:
   register means responsive to a margin signal corresponding to the end of the display zone of said video display means, wherein said register means enables said decoder means to display said dot pattern graphic display data received directly from said second memory means, and said dot pattern character representations received from said character generator means corresponding to said address words recalled from said second memory means.

6. The display control system of claim 5, further including means for displaying repetitive alphanumeric or graphic data comprising:
   repeat control means coupled to said second memory means, said decoder means, said character generator means and said data processor means for interpreting a repetition code in said second memory means associated with the data to be repetitively displayed, wherein upon detecting said repetition code said repeat control means inhibits the reading of said second memory means while causing said data to be displayed a predetermined number of times.

7. The display control system of claim 4, further comprising:
   a buffer memory means for inputting display data into said second memory means at a rate exceeding the data reading rate of said data processor means;
   first address register means for successively addressing memory locations of said buffer memory means by incrementing at the reading rate of said data processor means;
   second address register means for successively addressing memory locations of said buffer memory means by incrementing at said inputting rate;
   buffer address control means connected to said first and second address register means for generating an inhibit signal upon the equality of addresses stored in said first and second address register means, wherein said buffer address control means inhibit signal inhibits the inputting of display data into said buffer memory means until said data processor means has completely read the display data stored in said buffer memory.

8. The display control system of claim 7, wherein said buffer address control means comprises:

comparator means coupled to said first and said second address register means for comparing the contents thereof and generating an output signal when an equality is detected;

logic gate means coupled to said comparator means output for inhibiting the incrementing of said second address register means when said comparator means output signal is present; and multiplexer means coupled to said first and said second address register means and to said second memory means for alternately enabling the addressing of said second memory means by said data processor means and said inputted display data.

9. A method of displaying graphic and character data by a display control system which displays data on a video display of the raster scan type, said data arranged in a predetermined number of lines corresponding to line sweeps of said video display, said method comprising the steps of:

storing in a page memory the data to be displayed on said video display, said data arranged according to lines of said display and comprising:

for each line of character data, address values corresponding to the addresses of dot matrix character patterns stored in a character generator;

for each line of graphics elements, a dot pattern; and for each line of either character data or graphics elements, and identification code indicating whether the next data to be displayed comprises character data or graphic elements;

determining from said identification code if the mode of display for each line sweep is of character or graphics type; and if said mode of display for a given line sweep is of character type, accessing said page memory to obtain the locations in said character generator containing the alphanumeric characters to be displayed; and if said mode of display for a given line sweep is of graphics type, accessing said page memory to obtain the dot pattern for forming the graphic elements to be displayed.

10. The method of claim 9, further including the steps of:

storing a repetition code and a repetition value in said page memory associated with a selected stored element to be repeatedly displayed on said display device, said stored element being a character generator address in character mode and a dot pattern in graphics mode;

inhibiting the accessing of said page memory a number of times corresponding to said repetition value upon detection of said repetition code;

displaying an image corresponding to said selected stored element said number of times; and thereafter enabling the continued accessing of said page memory.

11. The method according to claim 9, further including a method for transferring data between a first system and a second system, wherein said second system has a greater data processing rate than said first system, comprising the steps of:

storing the data supplied by said second system in a buffer memory under control of a first address register capable of successively addressing all of the memory locations in said buffer memory at the data processing rate of said second system;

successively retrieving said stored data under control of a second address register capable of successively addressing all of the memory locations in said buffer memory at the data processing rate of said first system;

comparing the contents of said first and said second address registers and generating a signal when an equality is detected therebetween; and inhibiting the addressing of said buffer memory by said first address register upon the occurrence of said comparison signal, thereby inhibiting the transfer of data from said second system and preventing the overwriting in said buffer memory of data not yet retrieved by said first system.

12. The method of claim 11, further including the steps of:

comparing the contents of said first address register with the address of the first location in said buffer memory and generating a second signal upon the equality thereof;

comparing the contents of said second address register with the address of the first location in said buffer memory and generating a third signal upon the equality thereof; and inhibiting the addressing of said buffer memory said first address register only if said first signal occurs after the occurrence of said second signal and before the occurrence of said third signal.

* * * * *